C. F. REAMS.
Cotton Cultivators.

No. 137,959.  Patented April 15, 1873.

Witnesses.  
Wm J Pafton.  
A. H. Norris.

Inventor.  
Cornelius F. Reams.  
Per.  
James L. Norris  
Atty.

AM. PHOTO-LITHOGRAPHIC CO. N.Y. (OSBORNE'S PROCESS.)

UNITED STATES PATENT OFFICE.

CORNELIUS F. REAMS, OF RALEIGH, NORTH CAROLINA.

IMPROVEMENT IN COTTON-CULTIVATORS.

Specification forming part of Letters Patent No. 137,959, dated April 15, 1873; application filed April 4, 1873.

*To all whom it may concern:*

Be it known that I, CORNELIUS F. REAMS, of Raleigh, in the county of Wake and State of North Carolina, have invented certain new and useful Improvements in Cotton-Cultivators, of which the following is a specification:

This invention has for its object to furnish a cotton-cultivator, which embraces a pair of laterally adjustable scrapers for barring off or beveling the sides of the cotton row, followed by two bearing-wheels, which are located directly in rear of the scrapers so as to always travel upon a level surface of ground; one of said bearing-wheels, having its inner surface cogged for directly transmitting a rotary movement to a longitudinal shaft carrying adjustable cutters or hoes for chopping or thinning out, at regular intervals apart, the superfluous cotton-plants, the vacant spaces so formed being filled with earth by adjustable rearwardly-converging hilling-shares, located at the rear of the frame.

Figure 1:
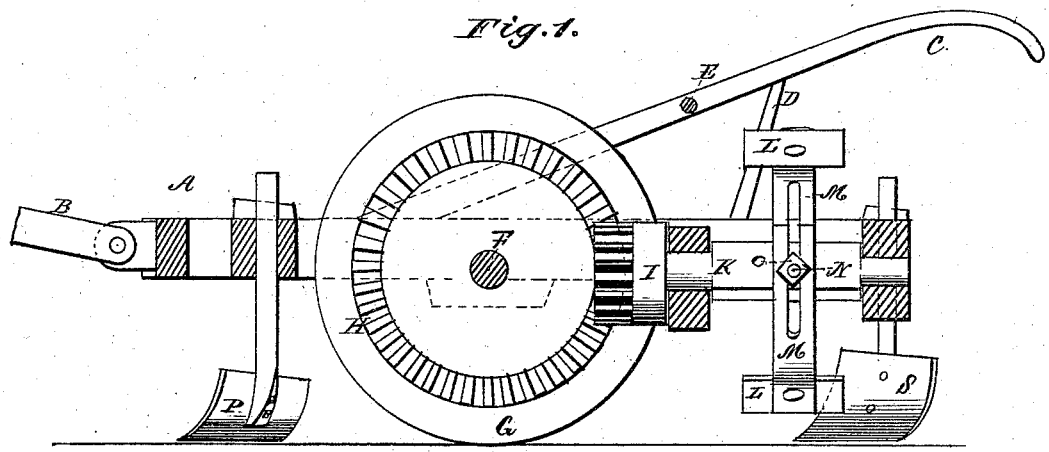
Figure 2:
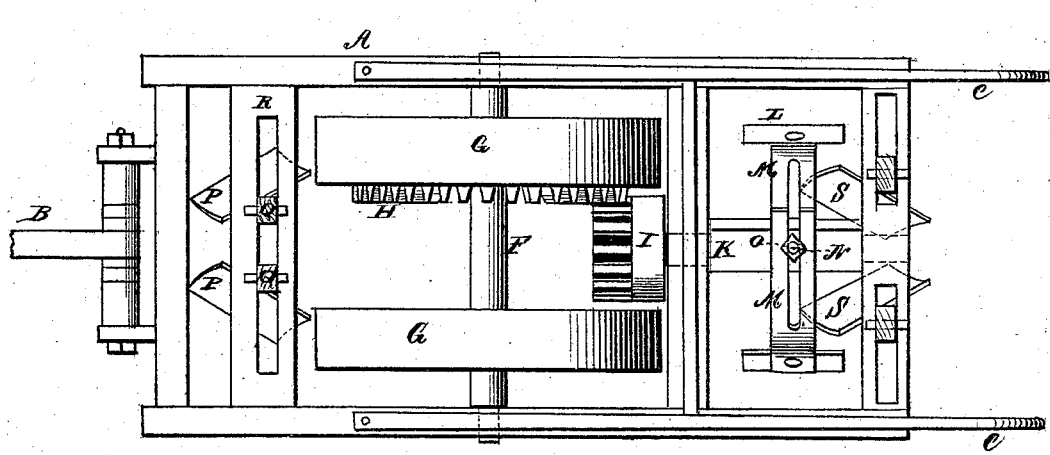

In the accompanying drawing, Figure 1 is a longitudinal sectional view of a cotton-cultivator embodying my invention. Fig. 2 is a plan view of the same.

The frame A, carrying the cultivating devices, is preferably of a quadrilateral form, and is provided with a pivoted draft-tongue, B, at its front end, and with guide-handles C connected by a round, E, and suitably supported by a brace, D. An axle or revolving shaft, F, extending transversely across the frame, and journaled in the side beams, carries two bearing or driving wheels, G, which are located immediately in rear of a pair of advance scraper-blades, P, the standards or legs Q of which are inserted into a slotted cross-bar, R, of the frame. The slots in said cross-bar are sufficiently large to permit the scrapers to be adjusted laterally in order to suit rows of various widths, or as circumstances require; and in order to firmly maintain the scrapers in their proper positions I employ wedge keys or gibs passing through slots in the standards, and serving, also, when the tenons of the standards and slots therein are long, to hold the scrapers in any desired position by driving said keys into the slots in the standards.

The scrapers, arranged as shown, perform the operation of barring off or beveling the sides of the cotton-row, and the bearing-wheels, being located immediately in rear or in line with the same, will always run upon an even surface of ground, so as to transmit a steady or regular movement to the chopping devices hereinafter described.

In proper relation to the bearing-wheels and their axle is situated a longitudinal shaft, K, which has its bearings in the rear beams located in rear of the wheels, as shown. Said shaft K carries two hoes or cutters, L, which are provided with bifurcated or slotted shanks M, attached to the shaft by clamping-bolts N and nuts O, so that by loosening said nuts the hoes are capable of being adjusted from or toward the shaft for regulating the depth of the cut or sweep of said hoes, according to the surface of the ground, as the case may require.

A continuous rotary movement is imparted to the hoe-shaft by a pinion, I, at its front end, which gears into a series of teeth or cogs, H, applied directly to the inner side of one of the bearing-wheels, as shown. The hoes or cutters L serve to chop out, at regular intervals, the superfluous cotton-plants, leaving the plants in rows, as is customary in the propagation of cotton. In rear of the chopping-hoes, at the sides of the frame, are located a pair of rearwardly and inwardly converging shovels or wings, S, which are so arranged as to throw the earth from the sides of the row into the spaces cleared by the chopping-hoes and front scrapers, thus raising hills or ridges for preventing the washing away of the cotton-plants, while a portion of the earth removed by said wings is thrown up at the sides of the plants.

The hilling plows or wings are also provided with shanks or standards, projecting through slots in the frame, for enabling the same to be adjusted laterally, and nuts applied to the screw-threaded ends of said shanks serve to hold the same in any desired position.

I claim as my invention—

The bearing-wheels G G, arranged between the side frames A A and directly in rear of the adjustable scrapers P P, for the object specified, for operation in connection with shaft K, pinion I, hoes L, and the rear hilling plows or wings S S, all arranged substantially as herein shown and described.

In testimony that I claim the foregoing I have hereunto set my hand this 3d day of April, 1873.

CORNELIUS F. REAMS.

Witnesses:
ALBERT H. NORRIS,
JAMES L. NORRIS.